UNITED STATES PATENT OFFICE.

WILLIAM E. HOUSTON, OF NEW HAVEN, CONNECTICUT.

IMPROVEMENT IN COMPOSITIONS FOR ARTICLES OF ORNAMENTATION.

Specification forming part of Letters Patent No. 33,391, dated October 1, 1861.

*To all whom it may concern:*

Be it known that I, WILLIAM E. HOUSTON, of the city and county of New Haven, and State of Connecticut, have invented a new and useful Composition for Making Various Useful and Ornamental Articles; and I do hereby declare the same is described and represented in the following specification, and to enable others skilled in the art to make and use the said composition, I will proceed to describe its component parts.

This invention consists of about equal parts, by weight, of rosin and shellac, mixed together and thickened with sawdust or other suitable substance to a proper consistency, care being had to the mixing therein of proper coloring material to produce the desired color, the whole being prepared and worked into a pasty mass very much in the ordinary way of preparing like compositions into a readiness to be formed into the desired article. It is composed of two gums—rosin and shellac—of about equal proportions—say for two pounds of gum I use of rosin varying from one-fourth to three-fourths, and the remainer of shellac, and add thereto about one and one-fourth pound of hardwood sawdust; and for color, for black add about two ounces of ivory-black, and for brown about two ounces of India red. Then warm the mixture on a steam-oven until the ingredients become soft and pliable. Then work it between steam-rollers until it is well mixed.

To form the composition into the desired article, I pass it between rolls warmed with steam to produce the proper thickness, and cut it into cakes or blanks to suit the dies, which dies, with the cake or blank, are warmed by a steam-oven, after which the dies, with the cake or blank therein, are pressed together, after which the article is ready for further use.

By the use of this improved compound I am enabled to produce a substance for making useful and ornamental articles at about one-half of the cost of other compositions now in use, and at the same time produce a substance fully equal in elegance of anything of the kind heretofore in use.

I do not claim broadly the use of resinous and woody matter as composite materials; but

What I claim, and desire to secure by Letters Patent, is—

A composition for useful and ornamental articles, made of rosin, shellac, and sawdust, the coloring-matter of which being composed of any suitable material, and in the proportions substantially as set forth.

WILLIAM E. HOUSTON.

Witnesses:
JEREMY W. BLISS,
JOHN R. WEBSTER.